US012551401B1

(12) United States Patent
Mirzaei et al.

(10) Patent No.: US 12,551,401 B1
(45) Date of Patent: Feb. 17, 2026

(54) SPA JET WITH CROSSWISE AND TANGENT VENTURI FOR BOTH SPA WALLS AND SPA FLOORS

(71) Applicant: Waterway Plastics, Oxnard, CA (US)

(72) Inventors: M Reza Mirzaei, Agoura Hills, CA (US); William Crane Spears, Camarillo, CA (US)

( * ) Notice: Subject to any disclaimer, the term of this patent is extended or adjusted under 35 U.S.C. 154(b) by 78 days.

(21) Appl. No.: 18/633,802

(22) Filed: Apr. 12, 2024

Related U.S. Application Data

(60) Provisional application No. 63/460,157, filed on Apr. 18, 2023.

(51) Int. Cl.
*A61H 33/00* (2006.01)
*A61H 9/00* (2006.01)

(52) U.S. Cl.
CPC ....... *A61H 33/6057* (2013.01); *A61H 9/0021* (2013.01); *A61H 2201/0115* (2013.01); *A61H 2201/1238* (2013.01); *A61H 2201/1409* (2013.01); *A61H 2203/02* (2013.01)

(58) Field of Classification Search
CPC .............. A61H 33/6057; A61H 9/0021; A61H 2201/0115; A61H 2201/1238; A61H 2201/1409; A61H 2203/02
USPC ............ 4/541.6, 541.1, 492; 239/225.1, 398, 239/428.5; 261/75
See application file for complete search history.

(56) References Cited

U.S. PATENT DOCUMENTS

| | | | | |
|---|---|---|---|---|
| 4,441,488 A * | 4/1984 | Macabee | A61H 9/00 | 601/160 |
| 4,637,080 A * | 1/1987 | Hutchinson | A61H 33/60 | 137/433 |
| 4,751,919 A * | 6/1988 | Thomsen | A61H 23/04 | 601/156 |
| 4,837,870 A * | 6/1989 | Wiley | A61H 33/6021 | 4/541.3 |
| 4,839,930 A * | 6/1989 | Watkins | A61H 33/6089 | 4/546 |
| 4,908,016 A * | 3/1990 | Thomsen | A61H 23/04 | 601/156 |
| 4,908,888 A * | 3/1990 | Watkins | A61H 33/6089 | 4/541.3 |

(Continued)

FOREIGN PATENT DOCUMENTS

| | | | |
|---|---|---|---|
| EP | 1269966 A2 * | 1/2003 | A61H 35/006 |
| EP | 4424431 A1 * | 9/2024 | B08B 3/02 |

(Continued)

*Primary Examiner* — Lori L Baker
(74) *Attorney, Agent, or Firm* — Sandy Lipkin

(57) ABSTRACT

A spa jet body that provides venturi in a crosswise and tangential orientation to the exit port of water/air mixture which provides for the elimination of moving parts inside of the jet body to create turbulence when in a perpendicular orientation and preserves precious space behind a vertical spa wall or a spa foot well. The venturi enters the inner circumference of the jet body turbulence chamber in a tangential and crosswise orientation, creating turbulence therein with the water/air mixture exiting out the massage head in a pulsating manner, the massage head being a face plate with exit apertures, some of them being specially designed for the footwell. The face plate connects to the jet body through a nut which is secured with screws that pass through the face plate onto the open perimeter top of the jet body.

5 Claims, 13 Drawing Sheets

(56) References Cited

U.S. PATENT DOCUMENTS 4,926,510 A * 5/1990 Watkins ................. A61H 23/04 601/148
5,074,286 A * 12/1991 Gillaspie ................ A61H 23/04 5/678
5,158,076 A * 10/1992 Thomsen ............... A61H 23/04 601/156
5,862,543 A * 1/1999 Reynoso ............ A61H 33/6052 239/394
6,094,754 A * 8/2000 Pinciaro ............. A61H 33/6063 285/139.2
6,428,466 B1 * 8/2002 Licht ...................... A61H 35/00 600/27
6,453,484 B1 * 9/2002 Pinciaro .................... F16L 5/10 4/541.6
6,491,238 B1 * 12/2002 Swanson ............ A61H 33/6052 239/590.5
6,551,263 B2 * 4/2003 Turner ................... A61H 23/04 4/575.1
6,723,233 B1 * 4/2004 Barnes .................. B01F 25/312 210/416.1
6,770,043 B1 * 8/2004 Kahn ................... A61H 9/0071 601/169
7,060,180 B1 * 6/2006 Barnes ...................... C02F 1/78 210/97
7,824,351 B2 * 11/2010 Heilman ............ A61H 33/6057 600/38
7,875,173 B1 * 1/2011 Barnes ................... A61H 33/14 4/541.1
8,241,410 B1 * 8/2012 Pease .................. B01F 25/4331 96/275
2004/0078885 A1 * 4/2004 Walker ................. A61H 33/601 4/541.1
2005/0059910 A1 * 3/2005 Licht ................. A61M 21/0094 601/55
2006/0036198 A1 * 2/2006 Cafaro ................. A61H 35/006 601/16
2008/0091060 A1 * 4/2008 Heilman ............ A61H 33/6057 600/38
2009/0121527 A1 * 5/2009 Galati, Jr. ................ A47C 1/11 297/217.4
2010/0149906 A1 * 6/2010 Burns, II .............. B01F 25/211 366/163.2
2011/0004048 A1 * 1/2011 Brunelle ............... A61M 21/02 600/27
2014/0157512 A1 * 6/2014 Yanity ................ A61H 33/0087 4/541.3

FOREIGN PATENT DOCUMENTS

WO WO-2005035038 A1 * 4/2005 ........ A61M 21/0094
WO WO-2007006947 A1 * 1/2007 ........... A61H 33/601

* cited by examiner

SPA JET WITH CROSSWISE AND TANGENT VENTURI FOR BOTH SPA WALLS AND SPA FLOORS

REFERENCE TO PRIOR APPLICATION

This application claims priority of the provisional patent application 63/460,157, filed Apr. 18, 2023 entitled SPA JET WITH CROSSWISE AND TANGENT VENTURI FOR BOTH SPA WALLS AND SPA FLOORS by M Reza Mirzaei.

BACKGROUND OF THE INVENTION

Field of the Invention

The field of this invention relates generally to the field of spa jets and more particularly towards a spa jet with crosswise and tangent venturi that can be utilized for both a spa wall and spa floors.

Description of the Prior Art

In spa jets, a venturi is used for creating a local vacuum, mixing air and water, then discharging the air and water mix into the spa water. In prior art spa jets, venturi discharge ports are in axial alignment with spa jet discharge port, i.e., the water enters the venturi in the jet in axial alignment with the discharge. This design, however has following shortcomings.

Firstly, the axial alignment of the venturi discharge port with the jet discharge port causes the discharge flow to be perpendicular to the jet face at the jet discharge port without any spinning massage pattern. To correct for this, complicated mechanisms including several moving parts such as bearings, spindles and spinners are used to create a rotating massage pattern at the jet discharge port. These rotating and moving components are subject to wear and tear, poor reliability and add to the complexity and cost of the jet.

Secondly, placement of the venturi orifice in axial alignment with jet discharge port requires ample space for the venturi discharge to diffuse, to house spinners and bearings and other associated components. As a result, these assemblies require long jet bodies which are situated to a significant depth behind the spa wall. These long jet bodies are not desirable by spa manufacturers because they require lots of space behind the spa wall. Additionally, in some particular spa shell locations including but not limited to the footwell bottom, due to the lack of required space, spa jets with axial venturis cannot be housed.

It is the object of the instant invention is provide a spa jet that overcomes above-mentioned to shortcomings.

SUMMARY OF THE INVENTION

The basic embodiment of the present invention teaches a spa jet assembly comprising: a jet body with a water spinning chamber, said water spinning chamber having an inner circumference; a venturi entry port that discharges water or a mixture of water and air in a crosswise and tangential orientation into said inner circumference of said jet body to generate a vortex and pulsating discharge from said jet body without the use of any moving or spinning solid parts wherein said pulsating discharge exists through a discharge port through a faceplate into a spa.

The above embodiment can be further modified by defining that said face plate further comprises one or more discharge openings on said face plate.

The above embodiment can be further modified by defining that said one or more discharge openings are located on a tip of inward protruded orifices.

The above embodiment can be further modified by defining that said face plate further comprises pressure relief grooves to restrict complete blockage of waterflow from discharge port.

An alternate embodiment provides for a spa jet assembly comprising: a jet body that creates a water turbulence chamber; a jet face equipped with outlet openings located on the tip of inversed cone or other water hammer generating protrusions with similar geometries; a venturi that discharges water or a mixture of water and air in a same direction but offset to jet discharge ports and to generate deflection, change of water velocity and resultant water pulsation without the use of any moving solid part.

BRIEF DESCRIPTION OF THE DRAWINGS

For a better understanding of the present invention, reference is to be made to the accompanying drawings. It is to be understood that the present invention is not limited to the precise arrangement shown in the drawings.

DETAILED DESCRIPTION OF A PREFERRED EMBODIMENT

Figure 1:
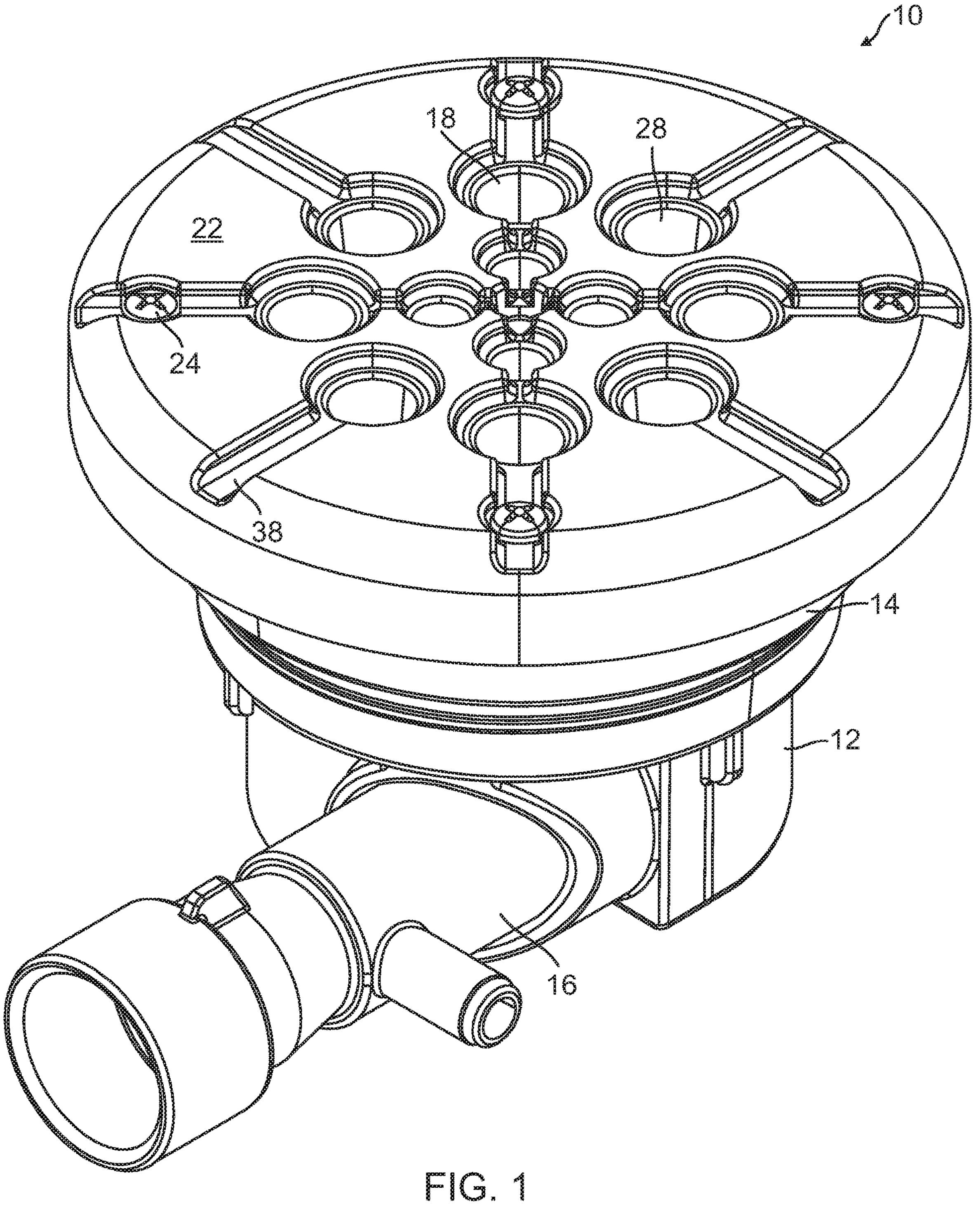
FIG. 1 is an isometric view of a first embodiment of the spa jet of the instant invention for placement on a vertical wall or bottom footwell of a spa.
Figure 2A:
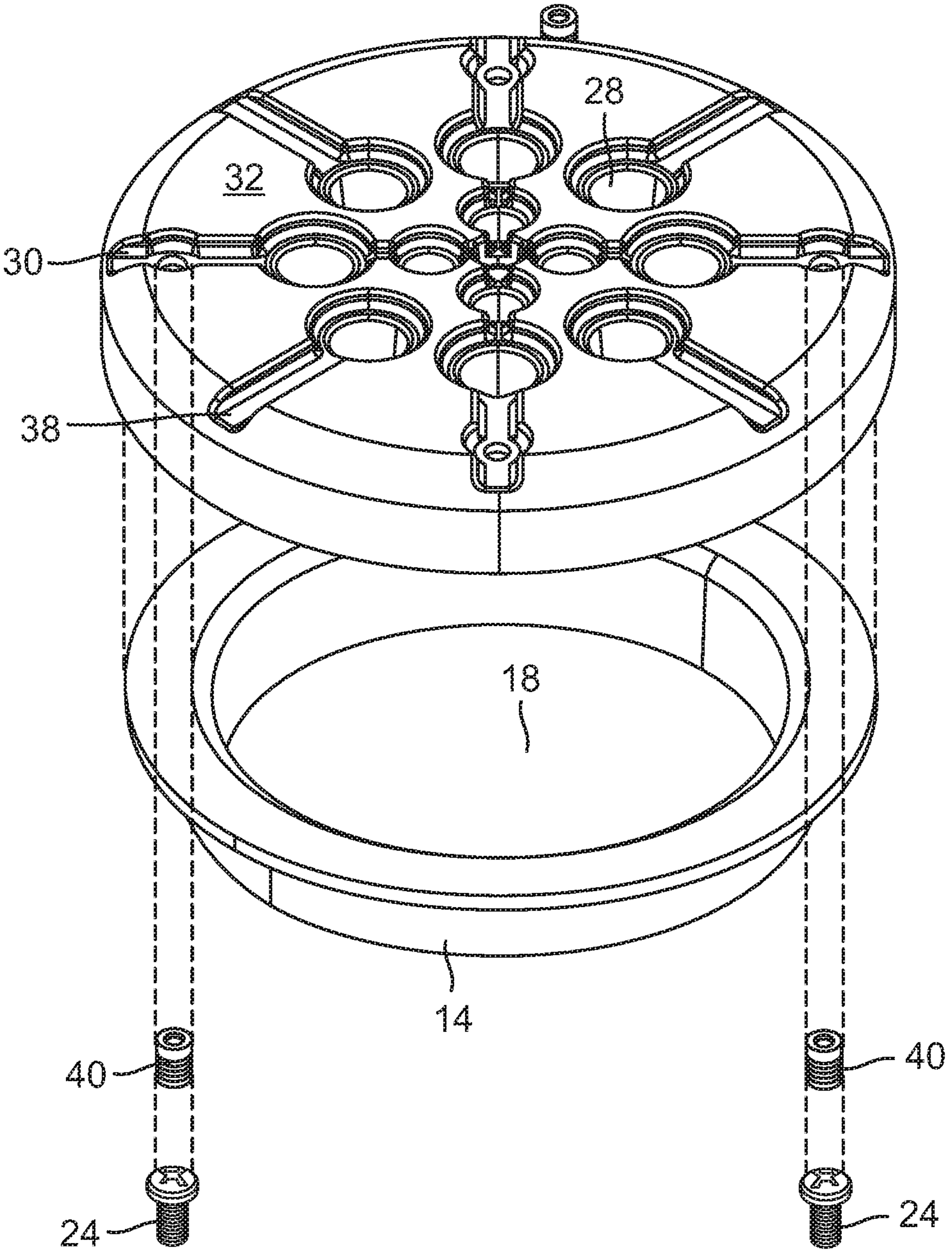
FIG. 2A is an exploded view of the face plate, the rubber grommet gasket, the brass inserts and the screws of the spa jet body of FIG. 1.
Figure 2B:
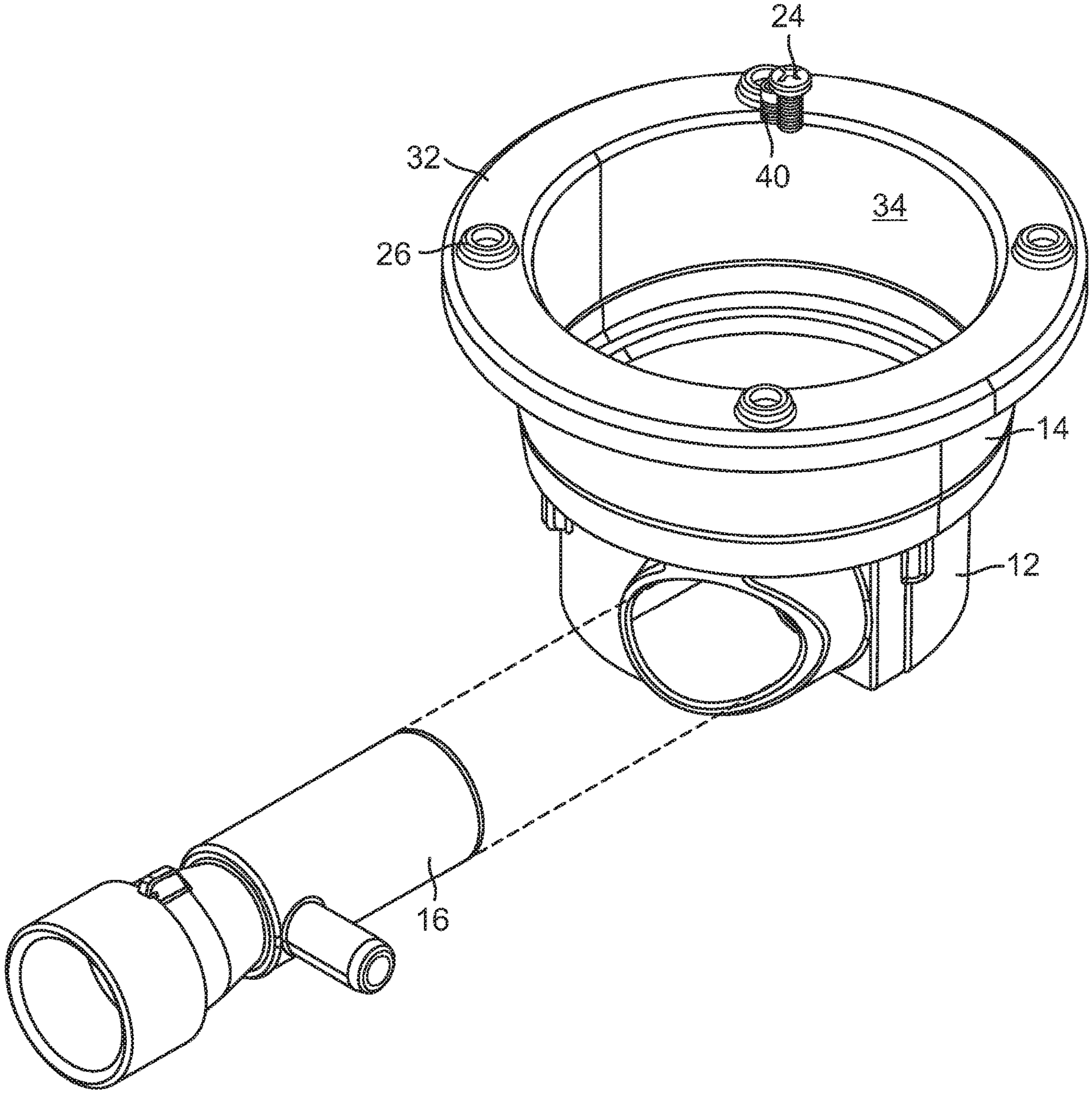
FIG. 2B is an exploded view of FIG. 1 with the face plate absent.
Figure 3:
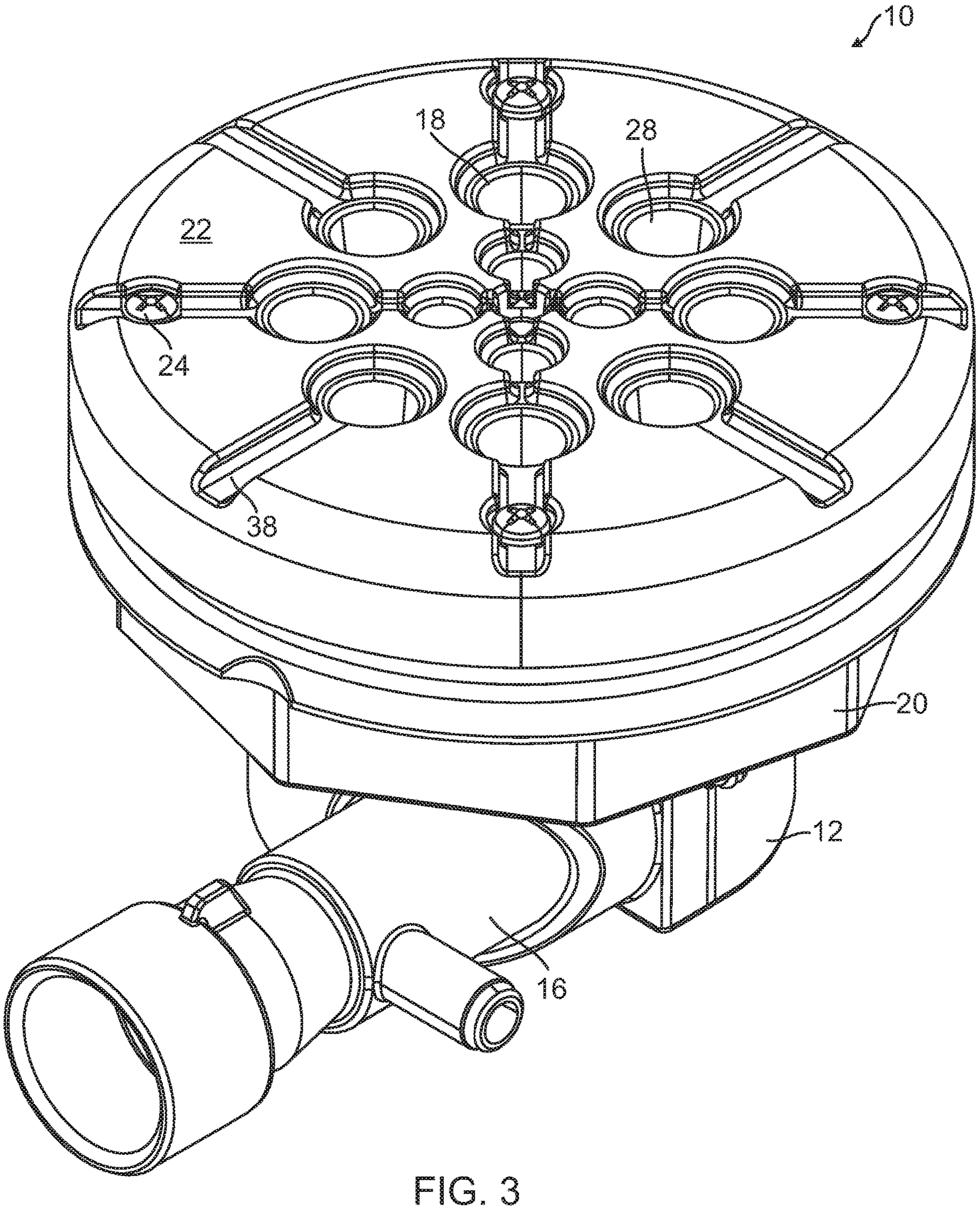
FIG. 3 is an isometric view of an alternate embodiment of FIG. 1 using a nut instead of a grommet gasket.
Figure 4A:
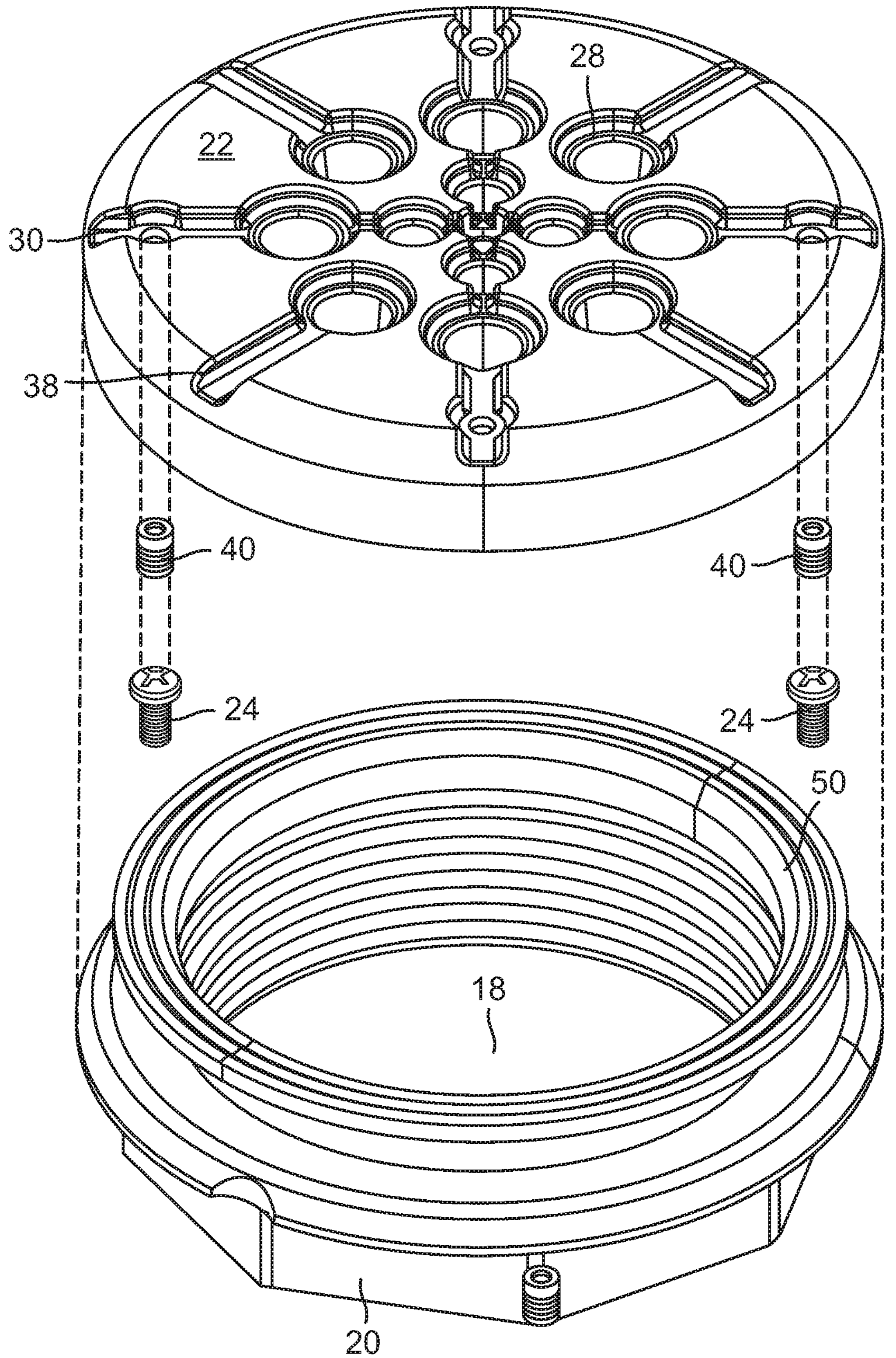
FIG. 4A is an exploded view of the face plate, brass inserts, screws, gasket with "L" cross section and the nut of the spa jet body of FIG. 3.
Figure 4B:
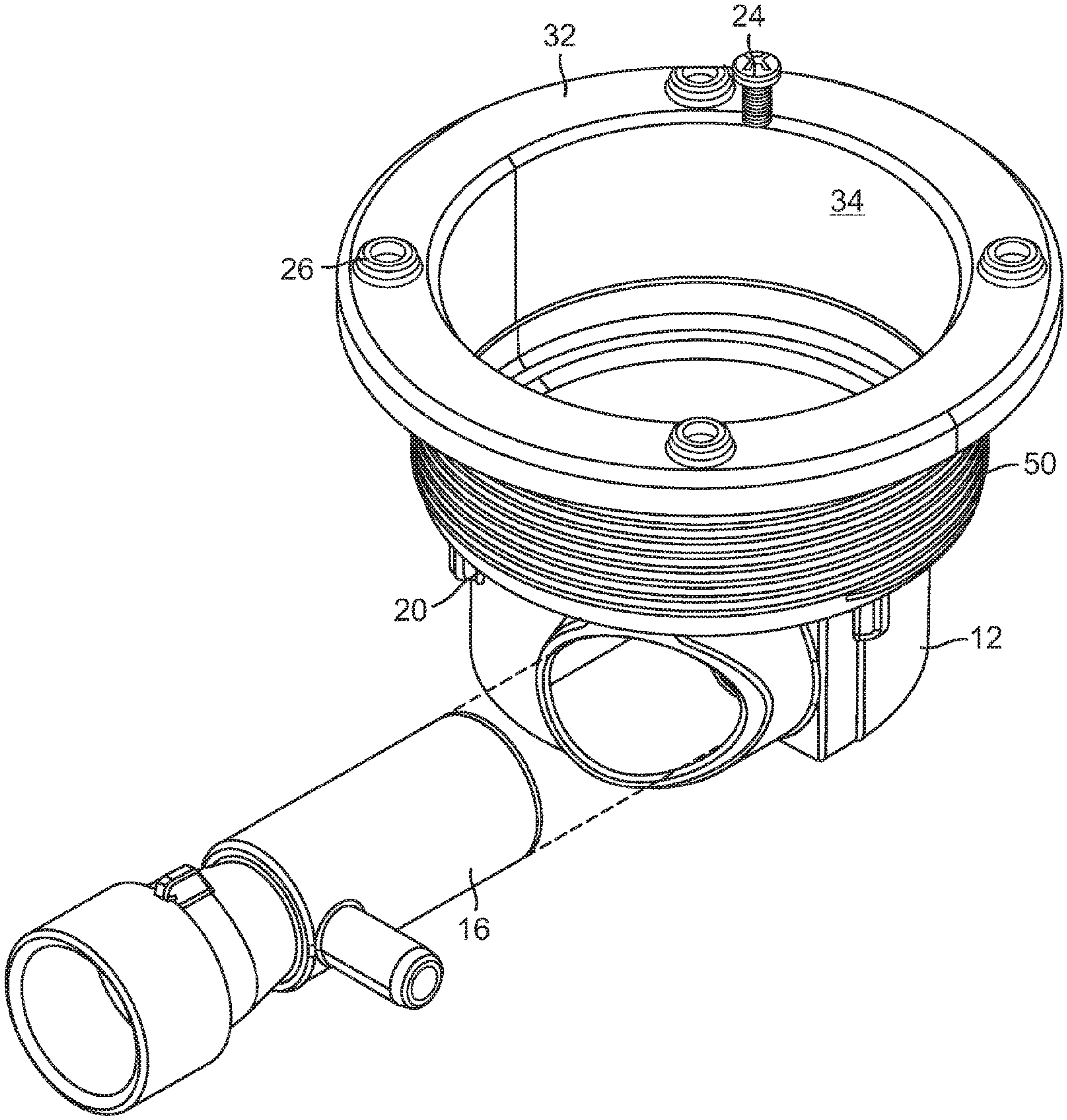
FIG. 4B is an exploded view of FIG. 3 with the face plate and gasket with "L" cross section absent.
Figure 5:
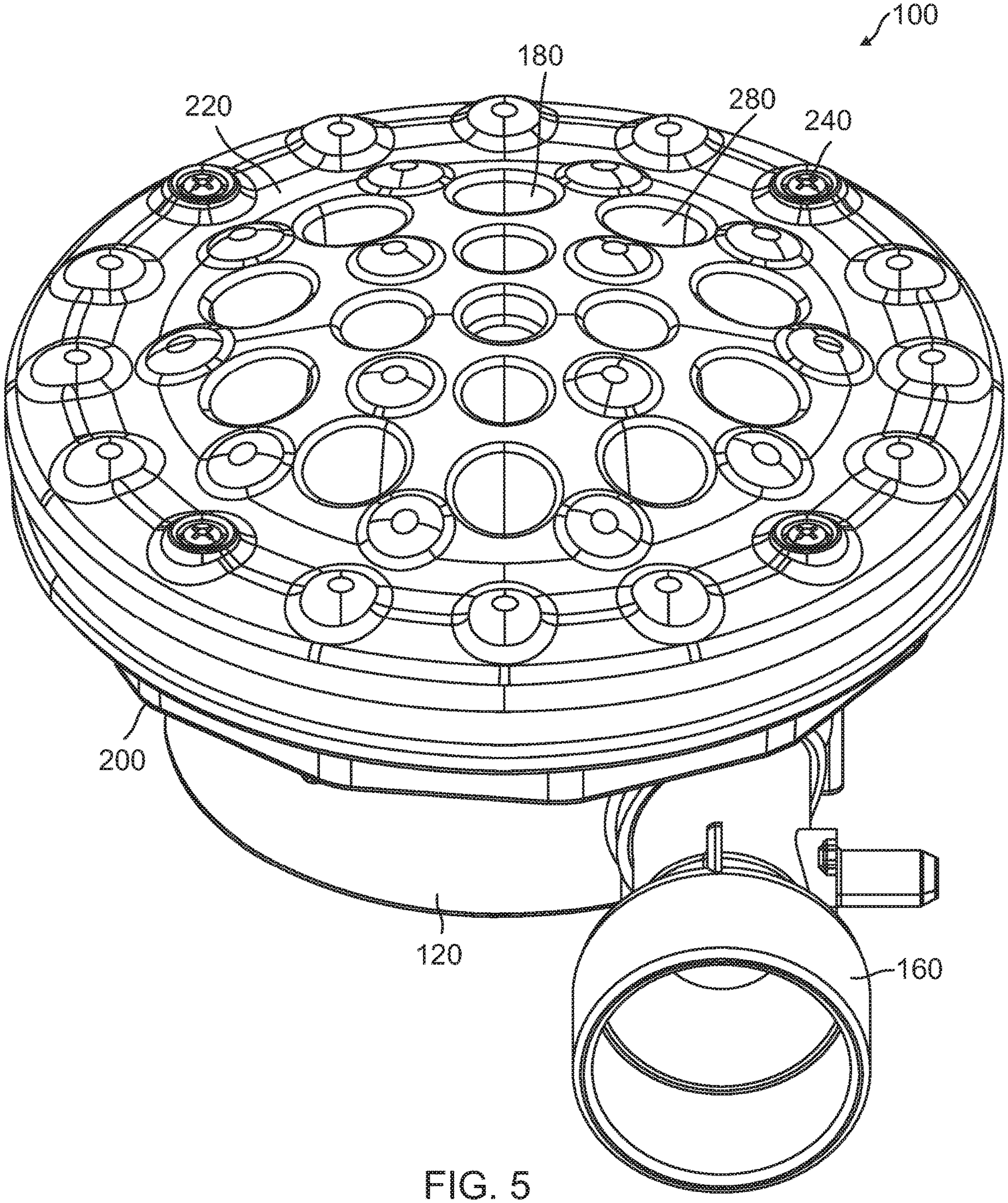
FIG. 5 is an isometric view of an alternate embodiment of the instant invention for placement in the foot well or vertical wall of a spa.
Figure 6A:
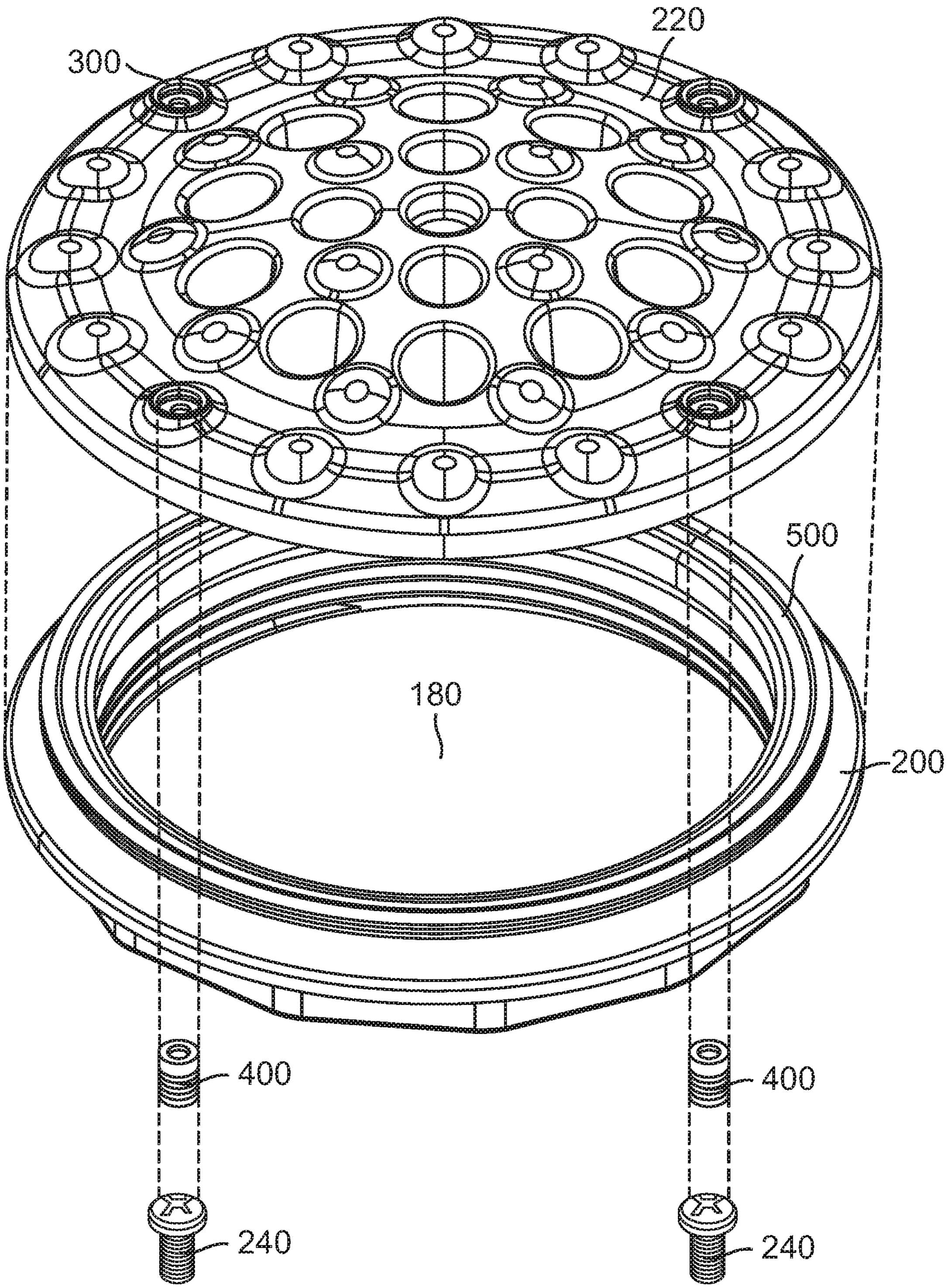
FIG. 6A is an exploded view of the face plate, gasket with "L" cross section, brass inserts and screws for attachment to the spa jet body of FIG. 5.
Figure 6B:
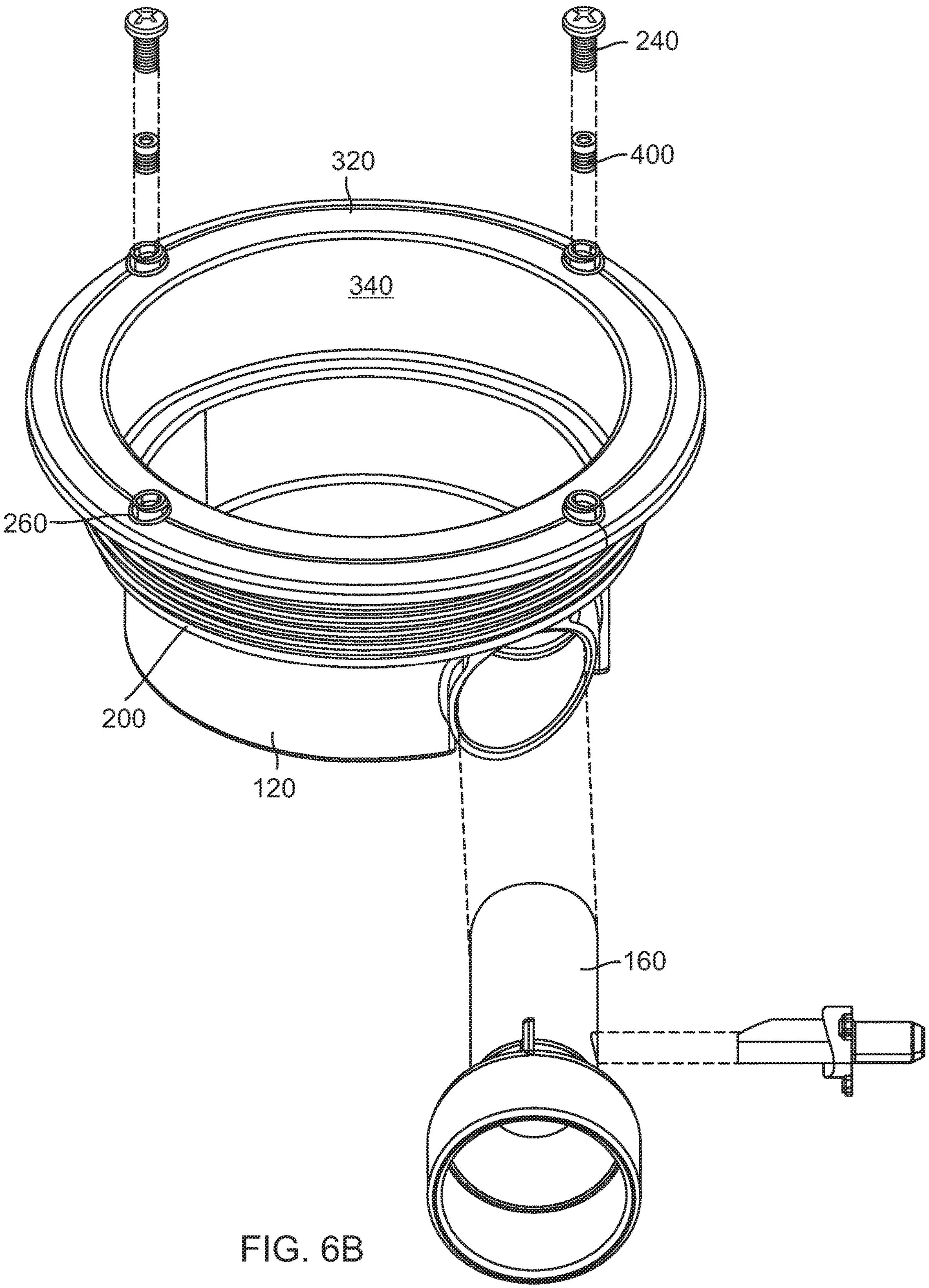
FIG. 6B is an exploded view of FIG. 5 with the face plate, gasket and nut absent.
Figure 7:
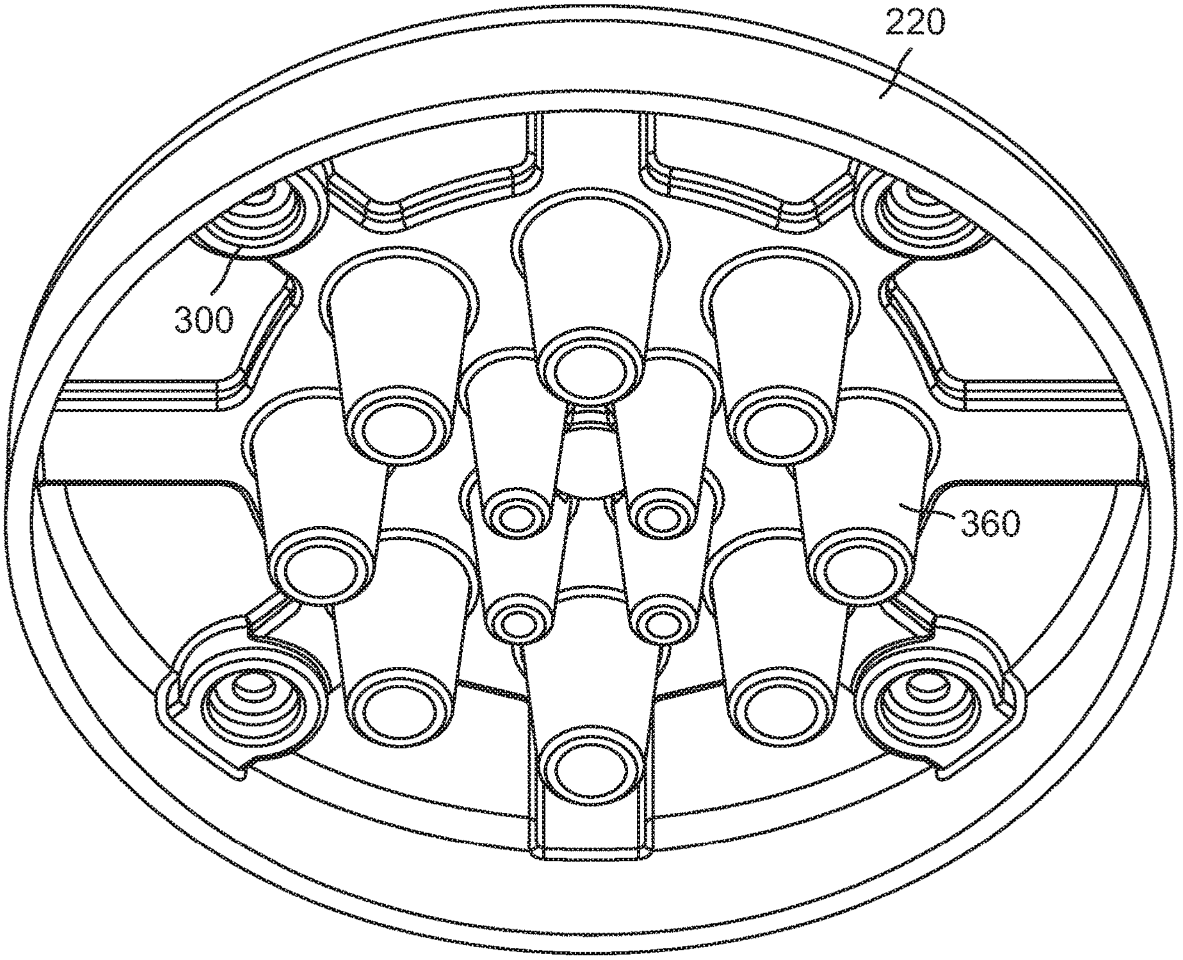
FIG. 7 is a bottom perspective view of the face plate of the FIG. 5 embodiment of the instant invention.
Figure 8:
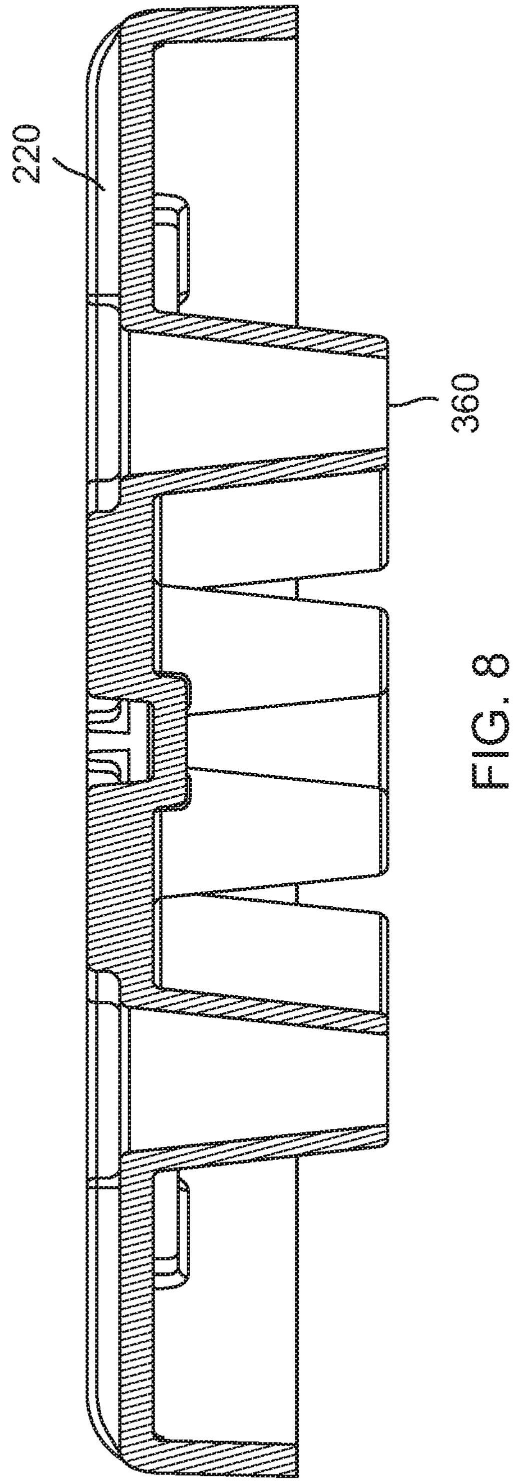
FIG. 8 is a side cross section view of the face plate of the FIG. 5 embodiment of the instant invention.

Turning to the drawings, the preferred embodiment is illustrated and described by reference characters that denote similar elements throughout the several views of the instant invention.

The instant invention provides for a spa fitting assembly 10 that includes a jet body 12 with a water spin generating chamber, a venturi fitting 16 attached to the jet body 12 in crosswise orientation to the jet discharge port 18 and tangential orientation to the jet body chamber 12. The discharge port 18 is covered by a face plate 22 that includes a plurality of apertures 28 through which the water/air mixture exits the spa fitting assembly 10 to contact the body of a person sitting in the spa. Behind the flange 32 of the jet body 12 is a grommet gasket 14 for securing and sealing the jet body onto the Spa shell in one embodiment. In another embodiment, the gasket 14 is replaced with a nut 20 and a gasket 50 with an "L" shaped cross section. Screw holes 30 in the face plate 22 allow for the placement of screws 24 and brass inserts 40 therethrough for securing to the top opening perimeter 32 of the jet body 12 where corresponding apertures 26 are found that line up with the screw holes 30 on the face plate 22. Pressure relief grooves 38 are also placed along the face plate 22.

Water or a mixture of water and air from the jet venturi 16 enters the spinning chamber 12 in a tangential orientation to the inner circumference 34 of the jet body 12 and in crosswise direction to the jet discharge port 18.

The tangential flow of water or water and air mixture creates a vortex inside the spinning chamber 12. This creates the desirable pulsating massage pattern at the jet discharge port 18 which is very desirable for creating a massage pattern with a natural feel while providing shorter jet bodies that can be installed in tighter and more restricted spaces such as a spa footwell.

Additional benefits of the crosswise and tangential spa jets include: 1) the spa jets are hydraulically more efficient due to the lack of spinning components and associated hydraulics losses; 2) the resultant vortex inside the spinning chamber naturally pulls some water inside while discharging the water from the discharge circumference in a pulsating pattern which is very desirable for bathers; 3) the spa jets create a finer mixture of air and water which is desirable for better massage feel and oxygenating the water.

For a foot massage jet, installation of the massage jets on the bottom of the spas foot well is very desirable. Installation of traditional spas jets are not practical due to a lack of adequate space behind the footwell wall for housing the traditional jet bodies. In traditional jet bodies the venturi is placed in axial orientation to the jet outlet openings which results in substantially long jet bodies that practically cannot be housed in available space behind the footwell bottom. Traditional jet bodies typically also use moving parts such as spinners, swinging or reciprocating parts that could interfere with bather's foot, and are subject to wear and tear of the moving parts and cannot create a randomized pulsation massage feel.

Another embodiment of the present invention teaches a low-profile spa fitting assembly 100 with a jet body 120 with a turbulence generator chamber, a jet face 220 equipped with outlets/openings that are located on the tip of inverse shaped cone or other water hammer generating protrusions with similar geometries.

Water or mixture of water and air from the jet venturi 160 enters the turbulence chamber 120 tangent to the inner circumference 340 and in crosswise direction to inversed cones or other water hammer generating protrusions with similar geometries. The discharge port 180 is covered by a face plate 220 that includes a plurality of apertures 280 through which the water/air mixture exits the foot well spa fitting assembly 100 to contact the feet of a person sitting in the spa. Between the face plate 220 and the jet body 120 is a nut 200. Screw holes 300 in the face plate 220 allow for the placement of screws 240 and brass inserts 400 therethrough for securing to the top opening perimeter 320 of the jet body 120 where corresponding apertures 260 are found that line up with the screw holes 300 on the face plate 220.

The tangential flow of water or water and air mixture creates a vortex inside the turbulence chamber 120 that after hitting the inversed cone or similar protrusions and deflection walls, causes a rapid change in water flow direction. This change of water velocity locally converts the kinetic energy of the water to pressure, creates pressure transients due to the water hammer effect. The resultant pressure spikes create the randomized pulsation of the jet discharge which is very desirable for creating a massage with a natural feel.

As a secondary benefit of the resultant pressure spikes, pressurization of air bubbles causes them to further break and dissolve into water which further oxygenates the massage water.

Figure 9A:
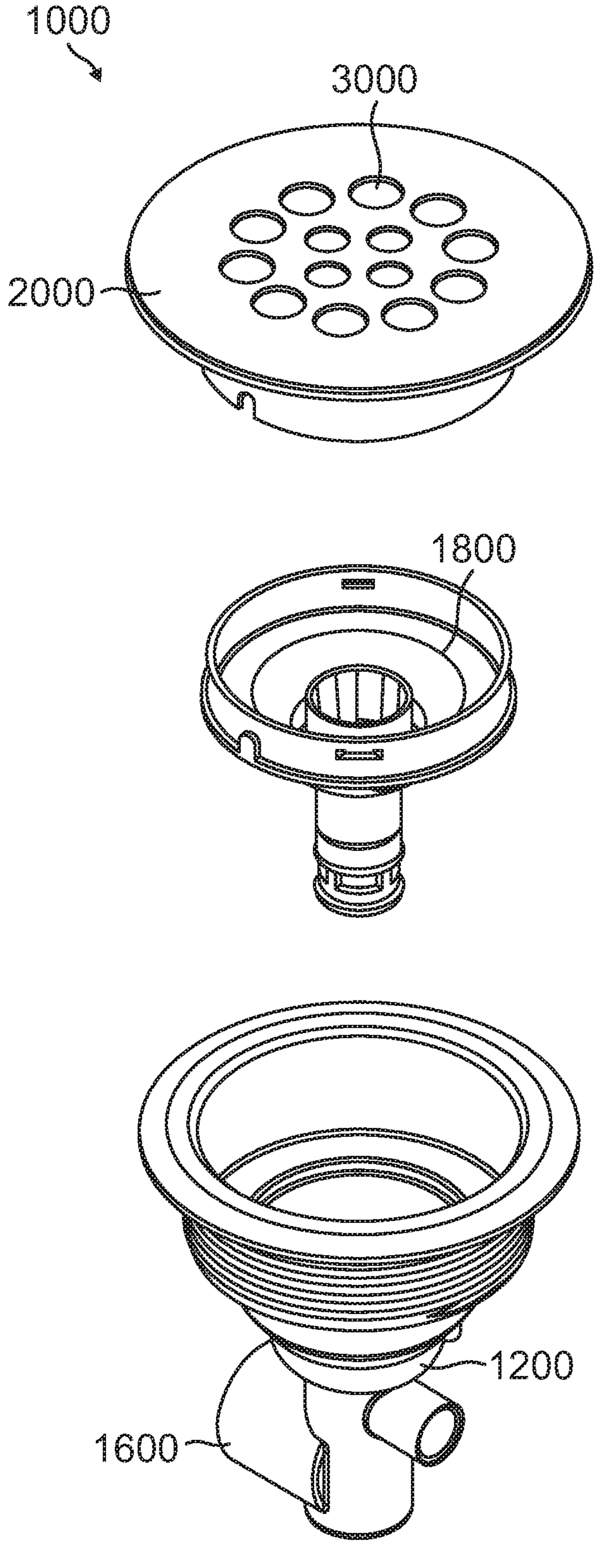
FIG. 9A is a top exploded view of an alternate embodiment of the instant invention that uses a traditional axial jet body with protruded inverted orifices under the face plate.
Figure 9B:
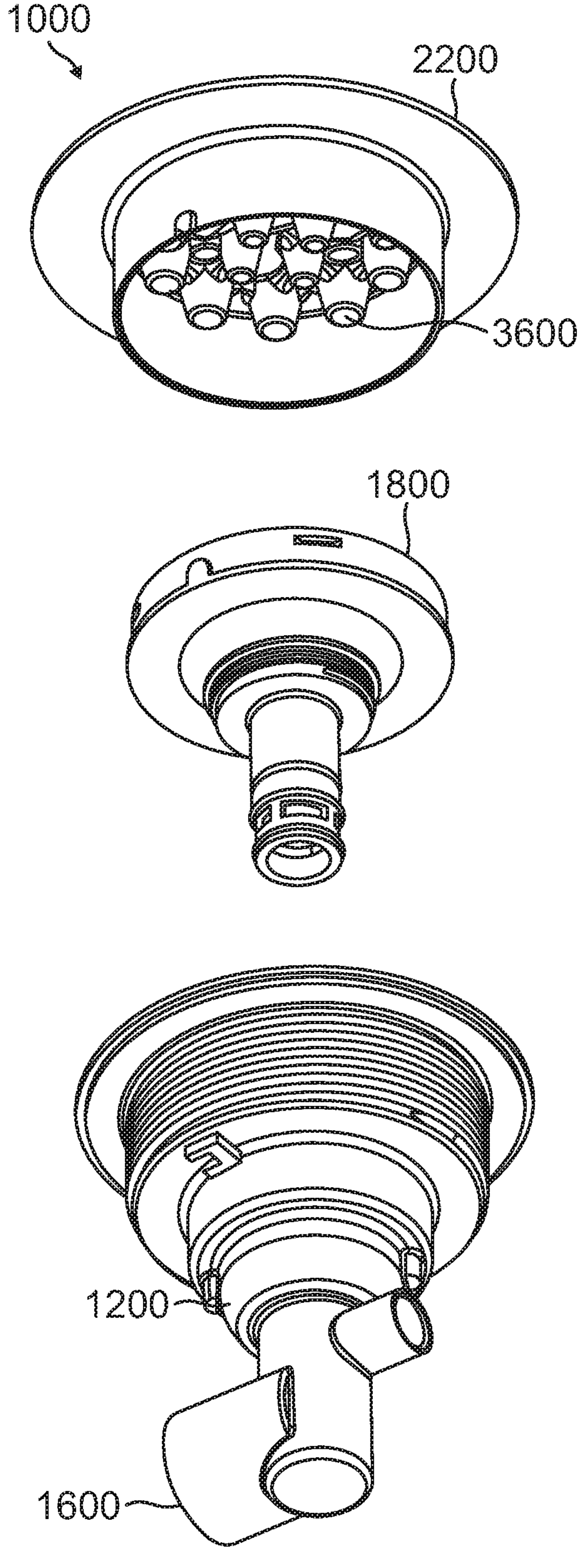
FIG. 9B is a bottom exploded view of FIG. 9A.

In another embodiment shown in FIGS. 9A-9B, the spa fitting assembly 1000 has a massage head face plate 2200 with one or more inward protruded orifices 3600 that are in the same orientation to venturi discharge port 1800 but also offset to the venturi discharge port 1800. This embodiment uses a traditional axial jet body 1200. A major portion of venturi offset flow of water or water and air mixture hits a deflation wall behind the inward protrusion openings, which causes a rapid change in water flow direction. This change of water velocity locally converts the kinetic energy of the water to pressure, creates pressure transients due to the water hammer effect. The resultant pressure spikes create the randomized pulsation of the jet discharge which is very desirable for creating a massage with a natural feel.

The invention illustratively disclosed herein suitably may be practiced in the absence of any element which is not specifically disclosed herein.

The discussion included in this patent is intended to serve as a basic description. The reader should be aware that the specific discussion may not explicitly describe all embodiments possible and alternatives are implicit. Also, this discussion may not fully explain the generic nature of the invention and may not explicitly show how each feature or element can actually be representative or equivalent elements. Again, these are implicitly included in this disclosure. Where the invention is described in device-oriented terminology, each element of the device implicitly performs a function. It should also be understood that a variety of changes may be made without departing from the essence of the invention. Such changes are also implicitly included in the description. These changes still fall within the scope of this invention.

Further, each of the various elements of the invention and claims may also be achieved in a variety of manners. This disclosure should be understood to encompass each such variation, be it a variation of any apparatus embodiment, a method embodiment, or even merely a variation of any element of these. Particularly, it should be understood that as the disclosure relates to elements of the invention, the words for each element may be expressed by equivalent apparatus terms even if only the function or result is the same. Such equivalent, broader, or even more generic terms should be considered to be encompassed in the description of each element or action. Such terms can be substituted where desired to make explicit the implicitly broad coverage to which this invention is entitled. It should be understood that all actions may be expressed as a means for taking that action or as an element which causes that action. Similarly, each physical element disclosed should be understood to encompass a disclosure of the action which that physical element facilitates. Such changes and alternative terms are to be understood to be explicitly included in the description.

What is claimed is:

1. A spa jet assembly comprising:

a jet body with a water spinning chamber, said water spinning chamber having an inner circumference;

a venturi entry port that discharges water or a mixture of water and air in a crosswise and tangential orientation into said inner circumference of said jet body to generate a vortex and pulsating discharge from said spa jet body assembly without the use of any moving or spinning solid parts wherein said pulsating discharge exists through a discharge port through a faceplate into a spa without the use of movable or spinning solid parts.

2. The spa jet assembly as defined in claim 1 wherein said face plate further comprises one or more discharge openings on said face plate.

3. The spa jet assembly as defined in claim 2 wherein said one or more discharge openings are located on a tip of inward protruded orifices.

4. A spa jet assembly comprising:

a jet body with a water spinning chamber, said water spinning chamber having an inner circumference;

a venturi entry port that discharges water or a mixture of water and air in a crosswise and tangential orientation into said inner circumference of said jet body to generate a vortex and pulsating discharge from said spa jet assembly without the use of any moving or spinning solid parts wherein said pulsating discharge exists through a discharge port through a faceplate into a spa wherein said face plate further comprises one or more discharge openings on said face plate wherein said one or more discharge openings are located on a tip of inward protruded orifices wherein said face plate further comprises pressure relief grooves to restrict complete blockage of waterflow from discharge port.

5. A spa jet assembly comprising:

a jet body for creating a water turbulence chamber;

a jet face equipped with outlet openings located on a tip of an inversed cone or other protrusion configurations with similar geometries;

a venturi port for discharging water or a mixture of water and air in a same direction, said venturi offset to a jet discharge ports capable of generating, said venturi port facilitates deflection, change of water velocity and a resultant water pulsation without the use of movable solid parts.

* * * * *